United States Patent Office 3,586,682
Patented June 22, 1971

3,586,682
PREPARATION OF PHTHALAZONE
Allen W. Sogn, Williamsville, N.Y., assignor to Allied Chemical Corporation, New York, N.Y.
No Drawing. Filed Dec. 19, 1968, Ser. No. 785,396
Int. Cl. C07d 51/02
U.S. Cl. 260—250                                   10 Claims

ABSTRACT OF THE DISCLOSURE

The yield and quality of phthalazone prepared by reaction of 3-hydroxyphthalimidine and hydrazine is improved by conducting the reaction in the presence of an acid having a pK value in the range of about 3.5–5.0 and/or a salt thereof. Purification of the product, useful as an intermediate in the preparation of pharmaceuticals, by recrystallization from dilute aqueous acid affords a pure white product.

BACKGROUND OF THE INVENTION

This invention relates to a process for the preparation of phthalazone, and in particular to an improved process for the preparation thereof by reaction of 3-hydroxyphthalimidine and hydrazine in the presence of acid, followed by recrystallization from dilute aqueous acid.

1(2H) - phthalazinone, more commonly known as phthalazone, is an important intermediate in synthetic organic chemistry, especially in the field of pharmaceuticals. This compound is often prepared by reaction of 3-hydroxyphthalimidine with hydrazine according to the following sequence:

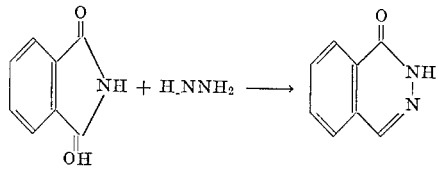

with the 3-hydroxyphthalimidine available by alkaline zinc reduction of phthalimide. Dunet and Willemart, Bull. Soc. Chem. Fr., 1948, 1081–3, describes this reaction in detail, obtaining the desired product as yellow crystals in yields of about 85% of theory. Upon recrystallization from water in the presence of decolorizing charcoal, most of the color is removed. However, when the phthalazone is to be used in the preparation of pharmaceuticals or other products requiring very high purity, pure white phthalazone should be employed, which necessitates at least one and often several recrystallizations and decolorizing treatments or purifications involving hazardous organic solvents. Furthermore, such treatments are expensive and time consuming and result in loss of a substantial quantity of material. Other processes have been employed for the preparation of phthalazone, for example, by reaction of phthalaldehydic acid with aqueous hydrazine sulfate and sodium acetate as disclosed by Biniecki et al., Act. Polon. Pharm. 11, 27–30 (1955) (C.A., 50, 12062i). However, this reaction employs a relatively large amount of sodium acetate and affords a crude product with a low melting point. Furthermore, this process does not utilize readily available hydroxy phthalimidine and is not a preferred method. For these reasons, there is need for an improved process for the preparation of phthalazone from hydroxyphthalimidine which provides yields greater than those obtainable heretofore and a product of greater purity.

SUMMARY OF THE INVENTION

In accordance with the instant invention, it has now been found that the yield and purity of phthalazone, prepared by reaction of 3-hydroxyphthalimidine and hydrazine, is improved when the reaction is conducted in the presnce of an organic carboxylic acid having a pK value within the range of about 3.5–5 or water-soluble salts thereof. The product, obtained in yields in excess of about 90%, is purified to pure white crystalline solid by recrystallization from water at a pH not greater than about 4.

The phthalazone thus obtained may be used as a synthetic intermediate where high purity is required.

DETAILED DESCRIPTION OF THE INVENTION 3-hydroxyphthalimidine, the substrate material for the instant process, is a well known compound and can be easily prepared according to the method of Reissert, Ber. d. D. C. Ges., 46, 1484 (1913). The crude material, which melts with decomposition within the range of 169–174° C., can be used or it can first be recrystallized from water to afford pure material melting at about 180–183° C. without decomposition.

Hydrazine, its hydrate, or acid salts thereof, e.g., hydrazine sulfate, hydrazine phosphate, hydrazine hydrochloride, etc. may be used as the reagent in the instant process. Preferably, hydrazine hydrate or an aqueous solution thereof is employed. A slight excess, e.g. at least about 1.03–1.20 mol equivalent of the hydrazine reagent per mol of 3-hydroxyphthalimidine, is preferable for most efficient conversion.

The acid employed in the reaction medium of the instant process for the purpose of increasing the yield and purity of the product is an organic carboxylic acid having a pK value within the range of about 3.5–5, and water-soluble salts thereof. Among the suitable acids are included formic acid, acetic acid, propionic acid, butyric acid, adipic acid, lactic acid, monosodium citrate, benzoic acid, and the like. The water soluble salts of these acids, for example, the ammonium salts, alkali metal salts and alkaline earth metal salts, can also be used. Preferably, acetic acid and/or the soluble acetate salts are used. The amount of acid employed is generally small and can be varied over a considerable range. Preferably, between about 0.5 and about 1.25 mols of the acid, or salt thereof, per mol of 3-hydroxyphthalimidine is sufficient to produce the improvements in yield and purity.

The reaction of 3-hydroxyphthalimidine with hydrazine in the instant process is conducted in the general manner taught by the prior art. In accordance with a preferred mode of conducting this improved process, one part (by weight) of purified 3-hydroxyphthalimidine is heated to boiling under reflux conditions with about 4 parts of water, 0.5 part of 100% hydrazine hydrate and 0.5 part of glacial acetic acid. Reflux conditions are maintained for about 1–4 hours, and the mixture is then cooled and filtered. The resulting light yellow filter cake is washed well with water and dried to afford the desired product in excess of about 90% yield.

Purification of phthalazone produced by reaction of 3-hydroxyphthalimidine and hydrazine may be accomplished by recrystallization from water and the use of decolorizing charcoal, methods commonly used in the art. However, phthalazone has been difficult to purify by these methods, requiring several recrystallizations and relatively large quantities of charcoal to effect minimal purification and decolorization. It has now been unexpectedly found that recrystallization from an acidified aqueous medium affords a white product of high purity (as indicated by melting point) in a simple and efficient manner. The aqueous recrystallization medium will preferably have a pH less than about 4, more preferably less than about 2, by addition therto of a mineral acid such as sulfuric acid, hydrochloric acid, etc. Normal recrystallization techniques are employed in the instant process, with the phthalazone being slurried in about 20 parts of water to which sufficient acid had been added to adjust the pH. About 0.1 part of decolorizing agent, e.g., an activated carbon of vegetable origin, and about 0.1 part of filter aid, e.g., a flock filter aid, may be added, and the mass is heated to boiling to dissolve the phthalazone. After about 15 minutes boiling, the mixture is filtered hot to remove the carbon and filter aid and any other insoluble matter, and the clarified filtrate is cooled to about room temperature or lower and filtered. The white crystalline filter cake is washed with cold water and dried to afford the desired phthalazone product.

The product of the instant process is suitable as an intermediate in the synthesis of a great variety of useful organic compounds. For example, it may be converted to 1-hydrazinophthalazine, a hypotensive agent, by reatcion with phosphorus oxychloride followed by reaction with hydrazine hydrate and alcoholic sodium hydroxide, according to procedure in Sycheva et al., Med. Prom. S.S.S.R., 14, 13–17 (1960) (C.A., 54, 22669h). 2-methyl-phthalazone may be prepared by reaction of phthalazone with diazomethane followed by treatment with methanol, according to the procedure in Gomper, Chem. Ber., 93, 187–9 (1960). Other useful products exhibiting analgesic, antiphlogistic, tuberculostatic and antihistaminic activity, disclosed in British Pat. 808,636; German Pat. 1,005,072; Satado et al. Yakaguka Kenkyu 28, 609–20 (1951) (C.A., 51, 16483g); and Lenke, Arzneimittel-Forsch, 7, 678–81 (1957) are also prepared from phthalazone.

The following examples are provided to more fully illustrate the instant invention. They are provided for illustrative purposes only and are not be construed as limiting the invention, which is defined by the appended claims. In the examples, parts and percents are by weight and temperatures are given in degrees centigrade unless otherwise specified.

EXAMPLE I

A mixture of 50 parts of recrystallized 3-hydroxyphthalimidine, 208 parts of water, 20 parts of 100% hydrazine hydrate and 24 parts of glacial acetic acid was heated to 80°. The resulting solution was heated to boiling under reflux conditions for one hour and forty minutes. White crystals appeared in the refluxing mass after about 40 minutes. The crystals darkened slightly as the refluxing was continued.

The slurry was cooled to about 20° and filtered. The filter cake was washed with two portions of 100 parts each of water. The washed cake was dried. The dried slightly yellow cake of phthalazone weighed 47.3 parts, representing a yield of 96.5% of theory (based on hydroxyphthalimidine), and melted at 186° to 186.6°.

EXAMPLE II

Phthalazone was prepared from 3-hydroxyphthalimidine according to the prior art method of Dunet and Willemart, op. cit., conducted in the following manner.

A mixture of 50 parts of recrystallized 3-hydroxy phthalimidine, 210 parts of water and 25 parts of 100% hydrazine hydrate was heated to boiling under reflux conditions while passing through a slow stream of nitrogen gas. The refluxing was continued for eight hours and 35 minutes. The off gas was passed into a scrubber filled with water to absorb ammonia gas. The scrubber liquor was titrated periodically with standard hydrochloric acid to follow the course of the reaction. The analysis indicated that 57% of the theory of ammonia was evolved in 50 minutes and 87.5% was evolved in two hours and 25 minutes. The mixture was cooled to 15° and filtered. The yellow filter cake was washed with water and dried.

The yield of crude phthalazone (M.P. 184.5°–184.7°) was 41 parts or 83.5% of theory. The crude material was recrystallized from 750 parts of water, including treatment of the solution with decolorizing charcoal, to give 34 parts (69.4% of theory) of a buff colored phthalazone melting at 185.7° to 186.1°.

EXAMPLES III–IV

The procedure of Example I was repeated with the amount of 3-hydroxyphthalimidine (HP), water and reflux time varied as indicated below, to afford relatively pure phthalazone in high yield.

| Experiment | HP | Water | Reflux time, hrs. | Product Yield, percent | M.P. degree, |
|---|---|---|---|---|---|
| III | 48.5 | 208 | 16 | 94.7 | 186.2–187.8 |
| IV | 50 | 160 | 1 | 95.8 | 184.8–186 |

EXAMPLES V–XV

A series of experiments were conducted in which the molar ratios of the reactants, 3-hydroxyphthalimidine (HP), hydrazine hydrate (HH), and glacial acetic acid (AA), were varied to study the effect of such variations upon the yield and quality of the phthalazone product.

These experiments were conducted in substantially identical fashion by slurrying one mol of 3-hydroxyphthalimide in 480 parts of water at 85°. The hydrazine and acetic acid were added rapidly causing the temperature to rise spontaneously to about 98° to 99°. The masses were maintained boiling under reflux for about three hours thereafter and then cooled to about 20°. The crude slurries were filtered, washed with water and dried. The yields and melting points of the products of these several experiments are set out in the table below.

| Experiment | Mols of— HP | HH | AA | Yield of phthalazone, percent | M.P. of product degrss |
|---|---|---|---|---|---|
| V | 1 | 1.1 | 1 | 97.3 | 185.5–186.3 |
| VI | 1 | 1.17 | 1.25 | 97.4 | 186.0–186.9 |
| VII | 1 | 1.17 | 0.75 | 96.0 | 186.8–187.4 |
| VIII | 1 | 1.03 | 0.75 | 96.0 | 186.1–187.1 |
| IX | 1 | 1.03 | 1.25 | 96.5 | 186.0–186.1 |
| X | 1 | 1.17 | 0.5 | 97.0 | 186.2–187.4 |
| XI | 1 | 1.1 | 0.5 | 94.8 | 186.2–187.4 |
| XII | 1 | 1.03 | 0.5 | 94.8 | 186.0–187.1 |
| XIII | 1 | 1.75 | 1.6 | 95.5 | 186.2–187.7 |
| XIV | 1 | 1.75 | 1.22 | 93.3 | 186.3–187.8 |
| XV | 1 | 0.935 | 1.1 | 90.5 | 183.5–184.7 |

EXAMPLE XVI

The procedure of Example III was repeated except that 32.4 parts of hydrazine sulfate and 32.8 parts of sodium acetate were used in place of 20 parts of hydrazine hydrate and 24 parts of acetic acid. The yield obtained was 47.5 parts (96.7% of theory) of phthalazone melting at 183.5° to 184.2°.

EXAMPLE XVII

The procedure of Example IV was repeated except that 20.6 parts of 80% formic acid was used in place of the acetic acid. The yield of crude phthalazone (M.P. 184.5° to 185.5°) was 45 parts (91.5% of theory). Upon recrystallization, 40 parts (M.P. 185.2° to 186.2°) of phthalazone were obtained.

EXAMPLE XVIII

The procedure of Example V was repeated except that an equimolecular quantity of boric acid was used in place of the acetic acid. The yield of dark yellow phthalazone, melting at 183.4° to 185.9°, was only 87.5% compared to the light yellow product melting at 185.5° to 186.3°, obtained in 97.3% yield using acetic acid.

Thus, substituting inorganic boric acid for the organic acid of the instant invention results in a product of lower purity and lower yield.

EXAMPLE XIX

A mixture of 127 parts of a moist filter cake containing 74.5 parts of 3-hydroxyphthalimidine (M.P. 173.4°)

188 parts of water and 37.5 parts of ammonium acetate was heated to 88° and then 33 parts of 85% hydrazine hydrate were added rapidly. The mixture was heated to reflux and maintained thereat for two hours. After being cooled to 20°, the mass was filtered and the filter cake was washed with 150 parts of water. After being dried, the yellow crystalline cake weighed 66 parts (90.5% of theory) and melted at 186.0° to 186.7°.

EXAMPLE XX (A) The reddish purple mother liquor obtained in Example XIX above to which an additional 100 parts of the moist filter cake of 3-hydroxyphthalimidine containing 74.4% solids, 3 parts of ammonium acetate and 33 parts of 85% hydrazine hydrate were added, was heated under reflux conditions for two hours as described in said Example XIX. There was isolated from this reaction mixture, 68.5 parts (93.2% of theory) of dark yellow phthalazone melting at 185.9° to 186.6°.

(B) The procedure of part A of this example was repeated using the mother liquor obtained therein as the reaction medium. From this run, 67.5 parts (91.5% of theory) of phthalazone melting at 185.9° to 186.7° was obtained.

(C) The procedure of part A of this example was repeated using the mother liquor from part B as the reaction medium. The yield of yellow crystals of phthalazone (M.P. 185.9° to 186.6°) was 69 parts (93.8% of theory).

EXAMPLE XXI

The crude phthalazone obtained in Part A of Example XX was dissolved in 1300 parts of boiling water. Two parts of decolorizing charcoal and one part of filter aid were added. The mixture was boiled for 15 minutes and then the sludge was filtered. The clarified filtrate was reheated to boiling and about 3.5 parts of 20° Bé hydrochloric acid were added. The solution, which became essentially colorless following the addition of the acid, was cooled to about 20°, filtered, and the filter cake was washed with cold water. The wash cake was dried to give 62.5 parts of water phthalazone crystals melting at 186° to 186.8°.

Similar recrystallization of the crude products of parts B and C of Example XX from water containing a like amount of hydrochloric acid give white crystalline products of excellent purity, as indicated by their melting points.

EXAMPLE XXII (A) Twenty parts of yellow colored phthalazone, M.P. 186.3 to 187.0, which had been recrystallized once from water including treatment wtih decolorizing charcoal, were dissolved in 400 parts of boiling water, and then recrystallized by cooling to about 20°. The recrystallized phthalazone weighed 18.4 parts, melted at 186.3° to 187.0° and was substantially the same yellow color as originally. The twice recrystallized material dissolved in aqueous sodium hydroxide to give a yellow solution which deposited yellow crystals upon neutralization.

(B) The procedure of Part A of this example was repeated using a like quantity of the same yellow phthalazone but differed by the addition of about 1.2 parts of C.P. hydrochloric acid to the hot solution prior to cooling to recrystallize the phthalazone. The phthalazone was obtained as white crystals, melting at 186.3° to 187.0°, and in the amount of 18.5 parts. This product gave a colorless solution in aqueous sodium hydroxide which deposited white crystals on neutralization.

EXAMPLE XXIII

A slurry of about 190 parts of a moist paste containing 149 parts of 3-hydroxyphthalimide in 439 parts of water was heated to 85°. As the mass is being agitated, 64.7 parts of 85% hydrazine hydrate and 45 parts of glacial acetic acid were added rapidly. The temperature of the mixture rose spontaneously to about 101°. The mixture was refluxed for about three hours and then permitted to stand for about sixteen hours. The product slurry was filtered at about 20°. The yellow crystalline cake was washed with 300 parts of water and then dried. The dried crude phthalazone M.P. 185.7° to 186.5°, weighed 137.9 parts (94.3% of theory).

This product was divided in half. One half was dissolved in 1300 parts of hot water (95° to 100°) and 2.4 parts of nuchar and about 6 parts of 25% sulfuric acid were added. The mixture was heated at about 95° for 15 minutes and then sludge filtered. The clarified filtrate was cooled to 20° and filtered. The white crystals, 63.6 parts, so obtained melted at 186° to 187.4°.

The other half of the crude product was recrystallized as described above except that the sulfuric acid was omitted. The phthalazone obtained was yellow in color.

EXAMPLE XXIV

A solution of 25 parts of crude phthalazone, prepared as in Example XXIII, dissolved in 500 parts of hot (95°–100°) water had a color, on the APHA color scale, exceeding 500. One part of decolorizing charcoal and 3 parts of filter aid were added to the solution, and after about 15 minutes contact with these agents, the sludge was filtered. The color of the hot clarified solution was 150 (APHA).

A portion of the clarified filtrate was cooled to crystallize phthalazone. A solution of one part of the resultant yellow crystals in about 70 parts of acetone had an APHA color of 35.

Prior to crystallizing phthalazone from other aliquots of the hot clarified filtrate, they were rendered acidic by the addition thereto of acid. In this fashion, the following acids were added, respectively, in the indicated amounts, to 20 part portions of the clarified filtrate, thereby reducing the color of the filtrate to the indicated levels.

| Addition: | APHA color after addition |
|---|---|
| 1 drop 25% $H_2SO_4$ (about 0.0013 g.) | <10 |
| 3 drops 25% $H_2SO_4$ (about 0.0039 g.) | <10 |
| 3 drops 70% $HNO_3$ (about 0.015 g.) | <10 |
| 3 drops 85% $H_3PO_4$ (about 0.014 g.) | About 20 |
| 3 drops 100% $CH_3CO_2H$ (about 0.12 g.) | 50 |

I claim:
1. In the process for the preparation of phthalazone by reaction of 3-hydroxyphthalimidine with hydrazine, the improvement which comprises conducting said reaction in the presence of an organic carboxylic acid having a pK within the range of about 3.5–5 or a water-soluble salt thereof.

2. The improved process of claim 1 wherein the amount of said acid employed is within the range of about 0.5–1.25 mol of acid per mol of 3-hydroxyphthalimidine.

3. The improved process of claim 1 wherein said acid is acetic or a water-soluble salt thereof.

4. In the process for the preparation of high-purity phthalazone in the form of essentially white crystals by
reacting 3-hydroxyphthalimidine with hydrazine,
separating the resulting crystalline phthalazone from the reaction medium, and then
recrystallizing said resulting crystalline phthalazone from an aqueous recrystlalization medium;
the improvement which comprises conducting the reaction of 3-hydroxyphthalimidine with hydrazine in the presence of an organic carboxylic acid having a pK value within the range of about 3.5–5, or a water soluble salt thereof, and
carrying out the recrystallization in an aqueous recrystallization medium which has been rendered acidic by incorporation therein of a mineral acid.

5. The process of claim 4 wherein the amount of said organic carboxylic acid employed is within the range of about 0.5–1.25 mol of acid per mole of 3 - hydroxyphthalimidine.

6. The process of claim 4 wherein said organic carboxylic acid is acetic acid or a water-soluble salt thereof.

7. The process of claim 4 wherein the pH of said recrystallization medium is less than about 4.

8. The process of claim 7 wherein said pH is less than about 2.

9. In the process for purification of phthalazone by recrystallization from an aqueous medium, the improvement which comprises effecting said recrystallization from an aqueous medium which has been rendered acidic by the incorporation therein of a mineral acid.

10. The improved process of claim 9 wherein the pH of said medium is less than about 4.

References Cited

Dunet et al., Bull. Soc. Chem (Fr) 1948 pages 1081–1083.

NICHOLAS S. RIZZO, Primary Examiner